Dec. 27, 1960   F. WALLER   2,966,095
SHUTTER FOR MULTI LENS CAMERAS
Filed Jan. 7, 1953   2 Sheets-Sheet 1
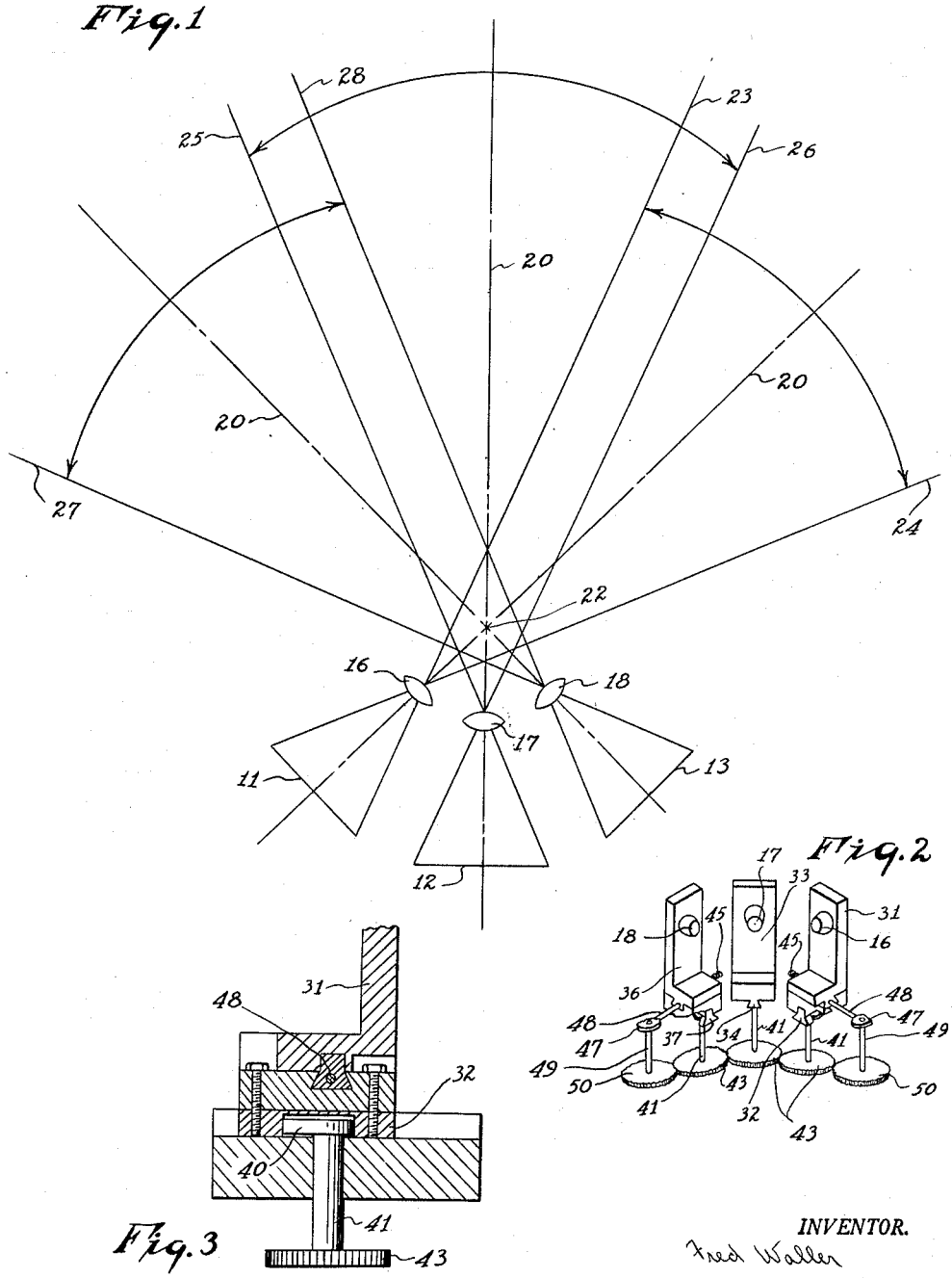
INVENTOR.
Fred Waller

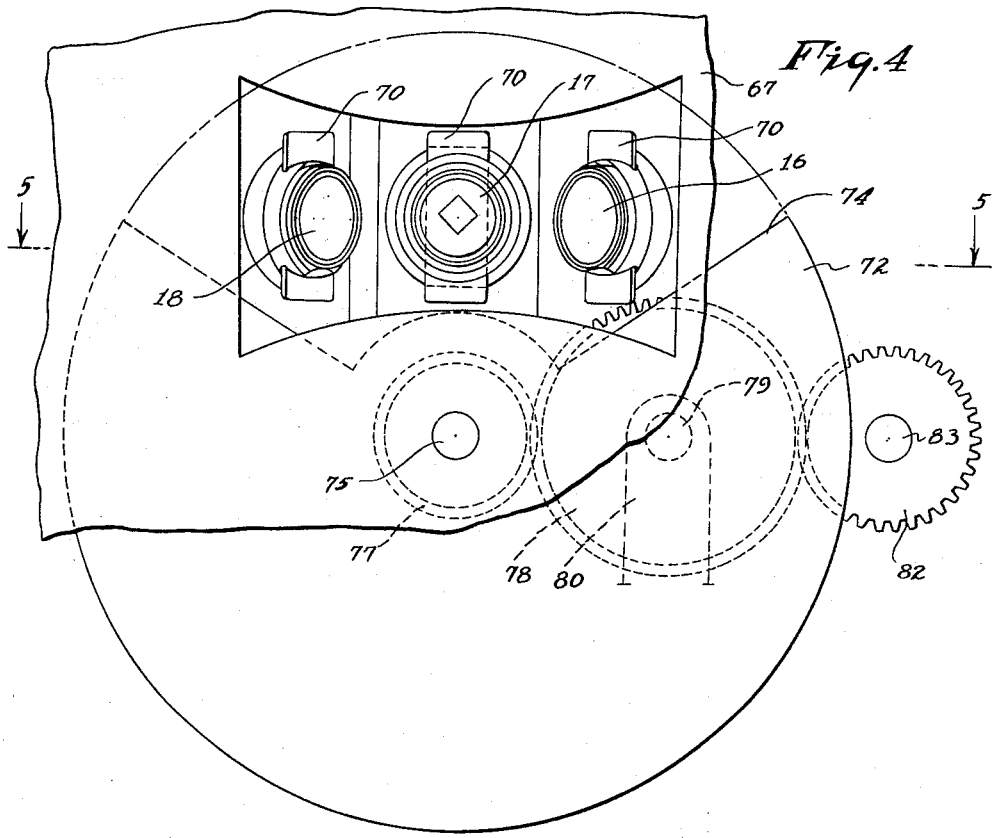

United States Patent Office 2,966,095
Patented Dec. 27, 1960

2,966,095

SHUTTER FOR MULTI LENS CAMERAS

Fred Waller, Huntington, N.Y., assignor, by mesne assignments, to The Prudential Insurance Company of America, a corporation of New Jersey Filed Jan. 7, 1953, Ser. No. 330,065

5 Claims. (Cl. 88—16.6)

This invention relates to cameras for taking motion pictures of adjacent sections of a scene on different films to obtain pictures that can be projected as a mosaic image on a common screen. The composite images are much larger than can be obtained with a single film.

One object of the invention is to provide an improved camera for taking pictures on separate films through lenses that have their optical axes in angular relation to one another. The invention is particularly concerned with the providing of a common shutter for controlling the light that passes through all of the lenses of the camera.

One feature of the invention relates to the synchronizing of a common shutter with a plurality of pull downs for different films; and another feature of the invention relates to the location of the shutter at a crossover point of the axes of the lenses so that a shutter of smaller size can be used for controlling the passage of light through all of the lenses.

Another feature of the invention relates to the focusing of a plurality of lenses that expose different film strips in the camera in combination with a single shutter that is supported independently of the focusing adjustment and that is capable of controlling the admission of light to all of the lenses in any focused positions of the lenses.

Other objects, features and advantages of the invention will appear or be pointed out as the description proceeds.

In the drawing, forming a part hereof, in which like reference characters indicate corresponding parts in all the views:

Figure 1 is a diagrammatic view showing the way in which the film gates and lenses of the camera are related for photographing adjacent sections of a scene, and illustrating also the crossover point of the optical axes of the lenses;

Figure 2 is a diagrammatic view showing the way in which lens mounts of the camera are movable to focus all of the lenses simultaneously;

Figure 3 is a diagrammatic view showing the camera mechanism for moving one of the lens mounts to change the focus of the camera.

Figure 4 is a fragmentary front elevation, partly broken away, showing the front wall of a camera casing with the plurality of converging lenses and a common shutter combined in accordance with this invention;

Figure 5 is a fragmentary plan view, partly broken away and in section, of the camera shown in Figure 3.

Figure 1 shows the camera of the invention diagrammatically, when focused for infinity. Three separate films are indicated by the reference characters 11, 12 and 13. The camera has three lenses 16, 17 and 18. The film 11 is in the focal plane of the lens 16; and the films 12 and 13 are in the focal planes of the lenses 17 and 18 respectively.

Perpendiculars 20, drawn from the centers of the focal planes of the lenses, and along the axes of the lenses, intersect at a point 22, which is known as the "crossover point" of the multiple lens camera.

The lens 16 photographs a field within the cone represented by the boundary lines 23 and 24; the lens 17 photographs a field within the cone represented by the boundary lines 25 and 26; and the lens 18 photographs a field within the cone represented by the boundary lines 27 and 28.

The lenses 16, 17 and 18 are movable toward and from their films to focus the camera for objects at different distances. Each of the lenses photographs a field which overlaps the field photographed by the next adjacent lens so that the separate images of the mosaic picture can be blended into one another by vignetting the overlapping zones of the separate images of the mosaic.

Figure 2 is a diagrammatic view showing the way in which all of the lenses are focused simultaneously. A lens mount 31, for the lens 16, has a dovetail slide 32 extending parallel to the optical axis of the lens 16. The lens mount is adjustable along this dovetail slide 32 to focus the lens.

A similar lens mount 33, for the lens 17, has a dovetail slide 34 extending parallel to the optical axis of the lens 17 and along which the lens mount 33 is movable to focus the lens 18.

All of the lens mounts 31, 33 and 36 are moved by cams 40 at the upper end of shafts 41, there being a separate shaft 41 under each of the lens mounts. These shafts 41 are rotated by gears 43 which mesh with one another so that they turn simultaneously. These gears are preferably of the same size so as to impart equal angular movement to each cam 40.

The focusing mechanism also includes means for shifting the side lenses 16 and 18 with respect to the center lens so as to correct for parallax when the focus is changed. In the construction illustrated, each of the lens mounts 31 and 36 is urged away from the lens mount 33 by a spring 45. A cam 47 bearing against a cam follower 48 moves the lens mount 31 against the tension of its spring 45. A similar cam 47 in contact with a cam follower 48 moves the lens mount 36.

The cams 47 are secured to shafts 49 which are rotated by gears 50 in mesh with the gears 43 so as to shift the lens mounts 31 and 36 transversely according to a predetermined displacement relation with the changes in the focus of the lenses.

Figure 3 shows the cam 40 extending into a recess in the bottom of the lens mount 31 for shifting the lens mount forwardly or rearwardly along the dovetail slide 32 as the shaft 41 rotates. The cam 40 can be an eccentric.

The lens adjustments for change of focus and for parallax correction are similar to those disclosed in Patent No. 2,583,030, issued January 22, 1952, to Fred Waller and Richard C. Babish. The gears 43 and 50 are operated by manually actuated means which need not be illustrated for a complete understanding of this invention.

Figures 4 and 5 show the construction of the shutter of this invention, and the way in which it is related to other parts of the camera. The camera includes three separate housings 51, 52 and 53. These housings contain the films 11, 12 and 13. The film 11 is located behind a film gate 54, and the films 12 and 13 are located behind similar film gates 54 in the other housings.

The lens mount 31, for the lens 16, is located in front of the housing 51 and is connected with the housing 51 by a flexible, bellows-like wall 55, which prevents the entrance of light into the housing 51 without interfering with the movement of the lens mount to change the focus of the lens 16.

The lens mounts 33 and 36 are similarly connected to the housings 52 and 53.

In each of the housings 51–53, there is a pull down 57 operated by the rotation of a shaft 58. These pull downs may be of any conventional construction.

The shaft 58 in the housing 53 is connected with the corresponding shaft in the housing 52 by gears 60. In like manner, the pull down operating shaft 58, in the housing 52, is connected with the corresponding shaft in the housing 51 by gears 60. The shaft 58 in the housing 53 has a spur gear 62 on one end meshing with a pinion gear 63 of a motor 64. This motor 64 drives the pull down mechanism in the housing 53, and through the gearing connections 60, drives the pull down mechanism in the other housings 51 and 52.

In the preferred construction of the invention, all of the pull downs operate simultaneously, but the gears 60 can be meshed so that the pull down mechanisms operate in sequence to one another, but always in a definite timed relation. The advantage of having all of the pull downs operate simultaneously is that a longer exposure is thereby made available for the films.

The housings 51–53 are enclosed within a casing having a front wall 67 in which there is an opening 68. This opening 68 is of such height, width and shape that it leaves the cones of the lens exposure fields unobstructed.

Figure 4 shows the relation of the different lenses 16, 17 and 18 to the opening 68 in the front wall 67. Each of these lenses 16–18 has an aperture plate 70 and these are adjusted so as to have the same lens stop for each lens.

A shutter 72 is located immediately behind the front wall 67 in position to cover the opening 68 so as to shut off all light to the lenses 16–18, except when the shutter is rotated into a position that locates a shutter opening 74 behind the opening 68 through the front wall 67.

The shutter 72 is rotatable on a center bearing 75 extending inwardly from the wall 67. A gear 77 also rotates on the center bearing 75 and is connected to the shutter 72 so as to rotate as a unit with the shutter. The gear 77 meshes with the idler gear 78 which is supported by an axle 79 carried by a bracket 80 which is connected to the front wall 67 below the gear 78.

The idler gear 78 is driven by a gear 82 secured to a shaft 83. This shaft 83 is, in turn, driven through bevel gears 85 from the pull down operating shaft 58 of the housing 51. From the description of the gearing it will be apparent that the motor 64 operates the pull downs for all of the films, and the shutter 72, in a definite predetermined time relation to one another.

In the construction illustrated, the opening 68, through the front wall 67, is located at the crossover point 22. This location makes possible the use of a smaller opening 68, and makes possible the use of a smaller shutter 72 because, at the crossover point, the exposure cones of all of the lenses intersect the plane of the front wall 67 over areas that most nearly coincide.

The preferred embodiment of the invention has been illustrated and described, but changes and modifications can be made without departing from the invention as defined in the claims.

I claim for my invention:

1. In a moving picture camera for taking mosaic pictures, a camera casing enclosing a plurality of different film strips, a plurality of lens mounts in the casing and horizontally spaced from one another and each of which is adapted to hold a lens in position to expose a different one of the film strips, the casing having a wall in front of the lens mounts and having a horizontally elongated opening in said wall, lenses in the mounts located in angular relation to one another and having their optical axes converging to a cross-over point in front of the lens mounts and then diverging beyond the cross-over point for imaging different scenes of adjacent fields, all of the lenses being in position to receive light through said opening and the optical axis of each lens being within the light cones of all of the lenses where it passes through said opening, and a common shutter that controls the passage of light through all of the lenses, the shutter being a plate located between the lens mounts and the casing wall, and bearing means on which the plate rotates about an axis vertically spaced from the plane containing the optical axes of the lenses, the plate being at a location where the light cones intersect one another.

2. The moving picture apparatus described in claim 1 and in which the shutter consists of a common rotary element that turns in front of all of the lenses and that has an opening therein which controls the admission of light to all of the lenses and the opening is wide enough to expose all of the lenses simultaneously.

3. The moving picture apparatus described in claim 1 and in which there is a different exposure station for a different film strip behind each lens, a separate pull down for advancing the different film strip to each separate exposure station, mechanism that operates all of the pull downs simultaneously, and mechanism synchronized with the pull downs and connected with the shutter to operate the shutter in timed relation with the pull downs.

4. In a motion picture camera for photographing adjacent sections of a landscape on separate film strips within the camera, separate pull downs within the camera for advancing the film strips to separate exposure stations located in the camera, each of the exposure stations having an associated lens mount, a lens in each lens mount, each lens, mount and exposure station being in angular relation to the exposure stations and lenses and mounts for the other films, the angular relation being such that the optical axes of lenses in the mounts converge to a crossover point in front of the lenses, the camera also having a front wall with an opening therein broad enough to give each lens a view across its angular field, the front wall being spaced in front of the lenses so as to be substantially at the crossover point of the optical axes so that a common area of the cross-section of said opening passes light to the different lenses, a common shutter that successively covers and uncovers said opening to admit light to all of the lenses, the shutter being located in front of the lenses and adjacent to said front wall, and mechanism synchronizing the operation of the shutter with the plurality of pull downs for the film strips.

5. The motion picture camera structure described in claim 4 with mechanism that operates all of the pull downs simultaneously, and with the common shutter consisting of a plate that rotates in front of the lenses at substantially the crossover point of the optical axes of the lenses.

References Cited in the file of this patent

UNITED STATES PATENTS

| | | |
|---|---|---|
| 372,856 | Lewis | Nov. 8, 1887 |
| 428,448 | Blair | May 20, 1890 |
| 642,163 | Schroeder | Jan. 30, 1900 |
| 904,212 | Moran | Nov. 17, 1908 |
| 1,163,549 | Leonard | Dec. 7, 1915 |
| 1,489,988 | Dickinson | Apr. 8, 1924 |
| 1,890,074 | Briechle et al. | Dec. 6, 1932 |
| 1,949,339 | Thomas | Feb. 27, 1934 |
| 1,984,953 | Thomas | Dec. 18, 1934 |
| 2,583,030 | Waller et al. | Jan. 22, 1952 |

FOREIGN PATENTS

| | | |
|---|---|---|
| 657,324 | France | Jan. 15, 1929 |